United States Patent [19] [11] Patent Number: 4,649,548
Crane [45] Date of Patent: Mar. 10, 1987

[54] LOCAL COMPUTER NETWORK TRANSCEIVER

[76] Inventor: Ronald C. Crane, 2101 California St., Mountain View, Calif. 94040

[21] Appl. No.: 536,223

[22] Filed: Sep. 26, 1983

Related U.S. Application Data

[63] Continuation-in-part of Ser. No. 242,708, Mar. 11, 1981, Pat. No. 4,479,228.

[51] Int. Cl.$^4$ .............................................. H04B 1/40
[52] U.S. Cl. ........................................ 375/7; 375/36; 330/189; 330/207 P; 455/58; 455/79; 371/57
[58] Field of Search ............... 330/185, 188, 189, 276, 330/207 P; 340/825.5; 455/58, 78, 79; 370/24, 28, 29, 32, 78; 375/7, 8, 36; 178/63 R, 63 C; 371/57, 59

[56] References Cited

U.S. PATENT DOCUMENTS

| | | | |
|---|---|---|---|
| 1,910,399 | 5/1933 | MacDonald | 330/189 |
| 2,281,997 | 5/1942 | Randall | 178/63 C |
| 3,369,075 | 2/1968 | Yourke et al. | 375/36 |
| 3,541,239 | 11/1970 | Reid | 375/36 |
| 3,851,098 | 11/1974 | Pingault | 375/36 |
| 4,270,214 | 5/1981 | Davis et al. | 375/36 |
| 4,326,287 | 4/1982 | Abramson | 370/29 |
| 4,384,356 | 5/1983 | Beerbaum | 375/36 |
| 4,388,716 | 6/1983 | Takezoe et al. | 370/29 |
| 4,425,663 | 1/1984 | Lam | 375/7 |
| 4,429,339 | 1/1984 | Jaeschke et al. | 330/207 P |

Primary Examiner—Benedict V. Safourek

[57] ABSTRACT

A local computer network transceiver is provided for a distributed control local computer network which applies a signal to a medium which has a DC component wherein isolation is implemented at the medium interface without need for direct current coupling of any active circuit to the communication medium. The medium is typically a coaxial cable. Transmit isolation transformers are coupled across a coaxial coupler, the medium side thereof being coupled in series with a diode. A plurality of transmit isolation transformers may be coupled in parallel to the medium to permit operation at substantially higher frequencies than would otherwise be permitted due to self-resonant frequencies of the isolation transformers. A receive interface through a receive isolation transformer is provided with capacitive balancing to prevent common mode voltages from being converted into recognizable signals. Collision detection circuitry is provided through diodes coupled to the input side of the transmit isolation transformer circuits, which collision detection circuitry is active only during transmit periods.

14 Claims, 3 Drawing Figures

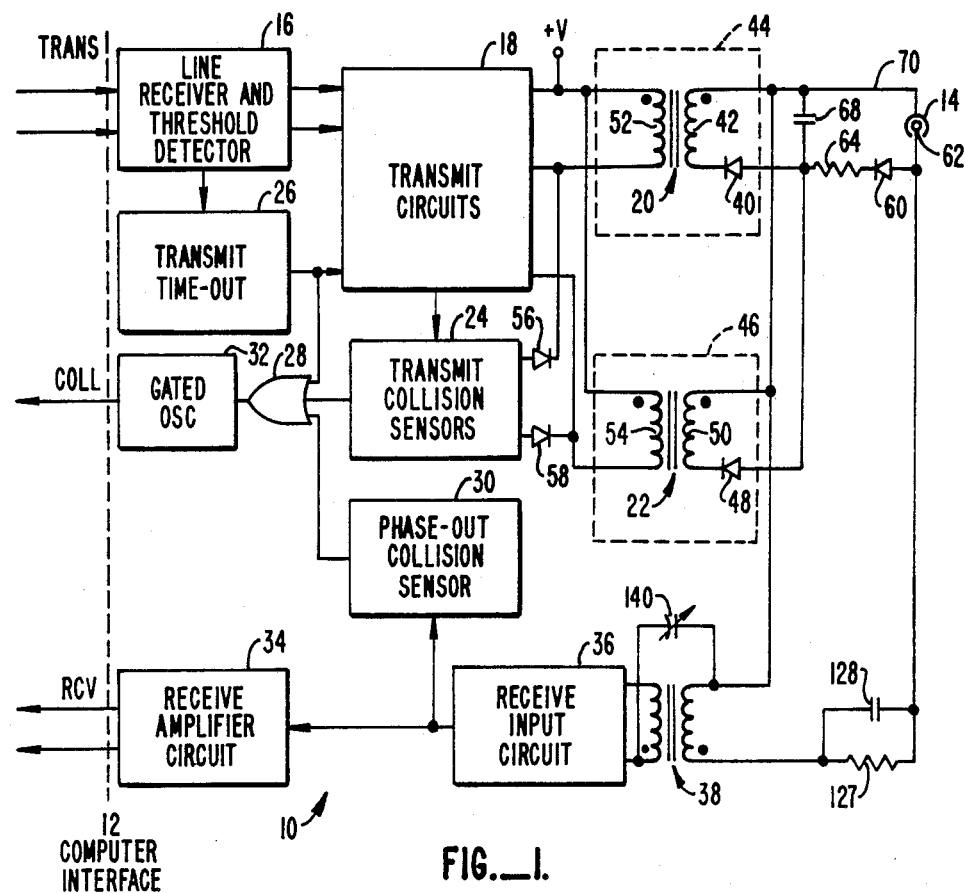
FIG._1.
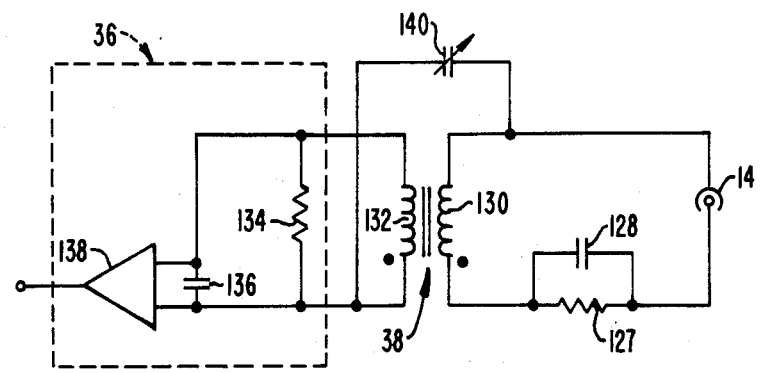
FIG._3.

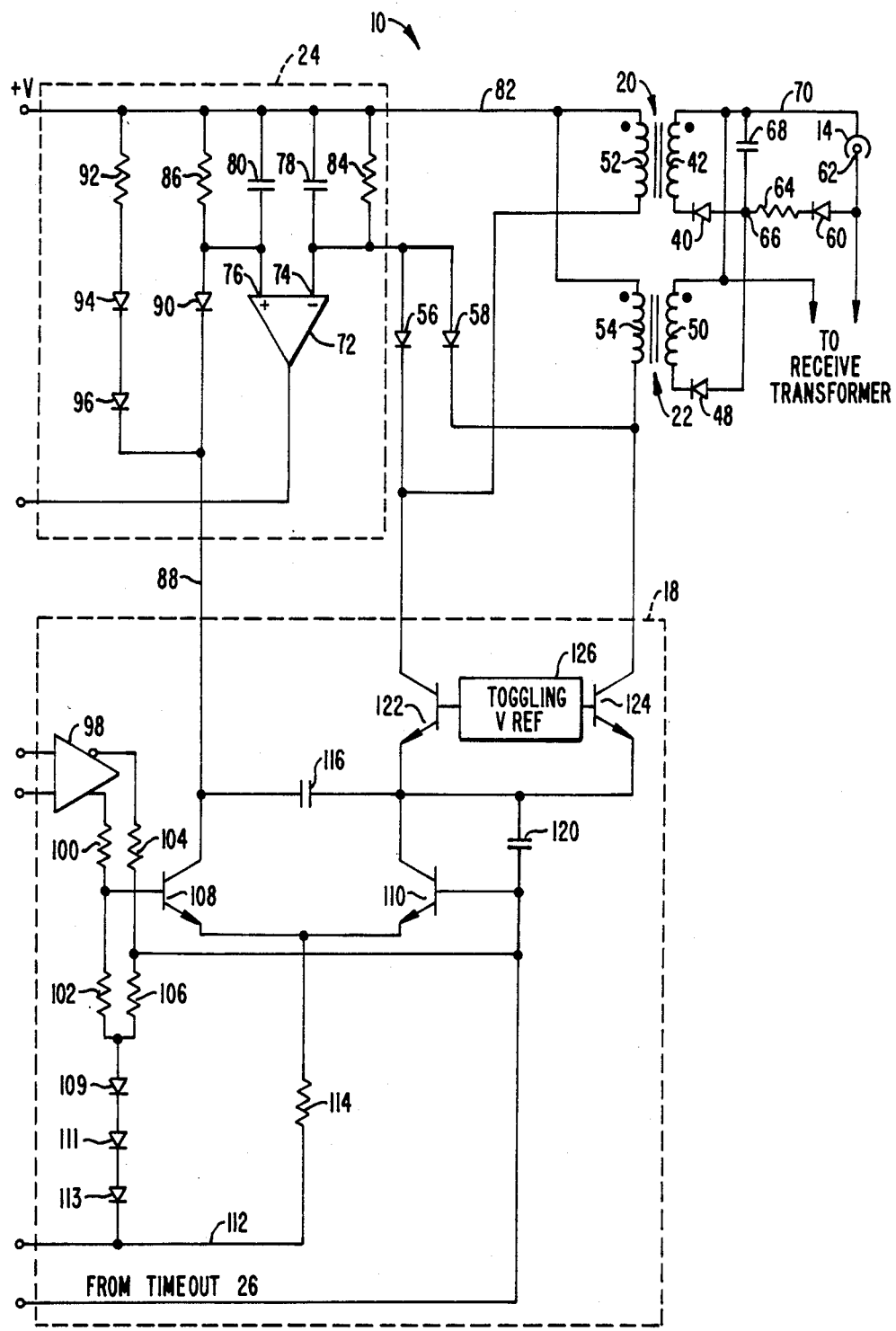
FIG._2.

LOCAL COMPUTER NETWORK TRANSCEIVER

CROSS REFERENCE TO RELATED APPLICATION

This application is a continuation-in-part application of co-pending application Ser. No. 242,708, filed Mar. 11, 1981, now U.S. Pat. No. 4,479,228, issued Oct. 23, 1984.

BACKGROUND OF THE INVENTION

1. Field of the Invention

This invention relates to the field of local computer networks and finds particular application when used with a high speed digital serial bus such as a coaxial cable. The specifications for a typical high speed digital serial link have been proposed and are known as the Ethernet. The Ethernet has been adopted as IEEE 802.3 Local Area Network Standard.

The present application is an improvement in the interface between the computer and the coaxial cable. One such interface has been described in the co-pending parent application Ser. No. 242,708, the subject matter of which is incorporated herein by reference and made a part hereof.

2. Description of the Prior Art

The parent application addresses and cites many of the references associated with the Ethernet local area communication system. In addition, U.S. Pat. No. 4,254,496, issued to Munter describes a digital communication system in which a local modem adapter employs transmit and receive lines and a line control circuit. The Munter reference fails to teach or show a collision detect channel and associated circuitry. U.S. Pat. No. 2,852,760 to Eckhardt describes a coded carrier remote control system employing balanced circuitry in which transformers are coupled directly to a communication medium. All stations transmit at the same frequency under a continuously transmitted pilot frequency generated at a control station. By contrast, in the present systems, there is no control station or slave stations. The Ethernet standard calls for a very high impedance coupling as compared with other media, which imposes a different set of constraints than is imposed upon other systems.

As the Ethernet standard local area network becomes more accepted, there has developed a need for more reliable, compact and efficient interface between the computer and the medium. In particular, there is a need to eliminate DC to DC converter apparatus used to power circuitry on the coaxial medium side of the medium isolation transformers.

SUMMARY OF THE INVENTION

According to the invention, a local computer network interface is provided for a distributed control local computer network which applies a signal to a medium which has a DC component wherein isolation is implemented at the medium interface without the need for direct coupling of any active circuits to the high impedance communication medium. The medium is typically a coaxial cable. Specifically, an isolation transformer is coupled across a coaxial coupler having a diode coupled to the coaxial medium in series with the medium-coupled winding of the transformer. In further specific embodiments, a plurality of isolation transformers may be coupled in parallel to the medium to permit operation at substantially higher frequencies than would otherwise be permitted due to the self-resonant frequencies of the isolation transformers. A receive interface through an isolation transformer is provided with capacitative balancing to prevent the common mode voltages from being converted into recognizable signals and with an input attenuator to assure high input impedance. Collision detection circuitry is provided through diodes coupled to the input side of the transmit isolation transformer circuits which collision detection circuitry is active only during transmit periods.

The invention will be better understood by reference to the following detailed description taken in connection with the accompanying drawings.

BRIEF DESCRIPTION OF THE DRAWINGS

FIG. 1 is a block diagram of a transceiver according to the present invention.

FIG. 2 is a schematic diagram illustrating key components of a transmit circuit and a transmit collision sensor in accordance with the invention coupled to an output isolation transformer.

FIG. 3 is a schematic diagram of the input circuit of a receiver circuit coupled to an input isolation transformer in accordance with the invention.

DESCRIPTION OF SPECIFIC EMBODIMENTS

Referring to FIG. 1, there is shown a block diagram of a transceiver 10 in accordance with the invention. The transceiver 10 comprises a plurality of circuits between a computer interface 12 and a coaxial coupling 14 for applying digital signals received by the transceiver 10 to a medium coupled to the coaxial coupling 14. Specifically, the transceiver 10 comprises a line receiver and threshold detector 16 coupled to receive balanced transmitted signals from the computer inteface 12 and coupled to provide a balanced signal to transmit circuits 18. The transmit circuits 18 are coupled to one or more transmitter isolation transformers 20, 22 which are coupled in parallel to the coaxial coupling 14. The transmit circuits 18 are also coupled to transmit collision sensors 24. The line receiver and threshold detector 16 is coupled to a transmit time-out circuit 26 which in turn is coupled to the transmit circuits 18 and to an OR gate 28 in a collision sensing subsystem. The OR gate 28 receives signals from the transmit collision sensors 24 and a phase-out collision sensor 30. The function of the phase-out collision sensor is to sense for the presence of a signal out of phase with the transmitted signal received at the line receiver 16. This transceiver only senses for collision conditions during signal transmission. The OR gate 28 is coupled to a gated oscillator 32 which provides as an output an indication of a collision condition to the computer interface 12.

A receive amplifier circuit 34 provides a balanced, amplified and compensated output to the computer interface 12 in response to signals received from a receive input circuit 36. The output of the receive input circuit is also provided to the phase out collision sensor 30. The input to the receive input circuit 36 is through a receiver isolation transformer 38, the function of which will be hereinafter explained.

According to the invention, the transceiver includes a first diode 40 coupled to the power output side 42 of the transmitter isolation transformer 20 to define together an output set 44. In a specific embodiment, a plurality of output sets, including an output set 46 having a second diode 48 coupled to the output side 50 of the transmitter isolation transformer 22, is coupled in parallel. The input side 52 of the transmitter isolation transformer 20 and the input side 54 of transmitter isolation transformer 22 are coupled at one node to a common reference voltage +V, which also serves as the power supply voltage for the transceiver 10. The other node of input side 52 is coupled to a first collision detection diode 56 and also to the transmit circuits 18. The other node of input side 54 is coupled to a second collision detection diode 58, as well as to the transmit circuit 18. First and second collision detection diodes 56 and 58 are coupled to the transmit collision sensors 24, as hereinafter explained.

The first diode 40 and second diode 48 are coupled physically closely to the output sides 42 and 50 respectively in order to minimize parasitic capacitance in the connection of the output sets 44 and 46 to the coaxial coupling 14.

As few as one output set is required for the transceiver 10 to function adequately. An output set enables an AC signal to be conveyed through the medium coupled to the coaxial coupling 14 which signal has a DC component in the medium. Multiple second output sets coupled in parallel may be driven alternately into active states to allow sufficient flyback recovery time for each output transformer at high operating frequencies. Voltage developed during flyback is isolated between, for example, first diode 40 and collision detection diode 56. The transformers are preferably controlled-loss devices having a Q of about 0.9 to 1.1 at resonance.

The parasitic capacitance of the coaxial coupling 14 can be further minimized by provision of a diode 60 coupled in series between the insulated center conductor 62 of the coaxial coupling 14 and the first diode 40. Diode 60 is preferably physically close to the coaxial coupling and further is coupled in series through a limiting resistor 64 to a node 66 to which the first diode 40 is also coupled. The limiting resistor 64 is for limiting current under fault conditions at the coaxial coupling 14. A filtering capacitor 68 is coupled between the node 66 and the shield 70 for filtering undesired high frequency components in the transmitted signal. The value of the capacitor 68 is selected so that the cut off frequency of signals applied to the medium is about two or three times greater than the design frequency of the transmitted signals. Diode 60 must be used if capacitor 68 is included.

Referring to FIG. 2, there is shown a portion of the transceiver 10 in greater detail comprising the transmit circuits 18 and transmit collision sensors 24 coupled to the transformers 20 and 22. The same components as illustrated in FIG. 1 are also designated in FIG. 2 with the same numerals.

The transmit collision detection sensor 24 comprises a comparator 72 having a first input 74 and a second input 76, the first input being coupled to a first capacitor 78 and the second input being coupled to a second capacitor 80, both of which are coupled to a stable voltage reference +V at a reference node 82. A first discharge resistor 84 is coupled in parallel across first capacitor 78 and a second discharge resistor 86 is coupled in parallel across second capacitor 80. First discharge resistor 84 and second discharge resistor 86 set the time constants for discharge of the levels developed at the inputs 74 and 76 respectively. Collision detection diodes 56 and 58 are coupled to a common node at input 74 with first capacitor 78 and first discharge resistor 84. When either of these diodes 56 or 58 begins to conduct, current is drawn which charges the capacitor 78 and sets the level at input 74. The second capacitor 80 is charged, whenever the transmit circuit 18 is powered, through a charging line 88. A switching diode 90 coupled between the second capacitor 80 and the charging line 88 rectifies the transmitted signal for charging the second capacitor 80. Collision threshold setting circuitry is provided at the node of the charging line 88. The collision threshold setting circuitry comprises a resistor 92, diode 94 and diode 96 all coupled in series to the node at line 88. Two diodes 94 and 96 are provided whenever two diodes 50 and 60 are employed. The level is established typically at minus 0.6 volt threshold corresponding to the collision level specified for the communication medium. This circuitry detects the presence of a DC component on the communication medium whenever the transmit circuitry is active without need for a direct current coupling to the communication medium.

The transmit circuits 18 comprise at the input a balanced input open emitter line receiver 98 producing a differential output to a pair of voltage dividers comprising resistors 100 and 102 on a first leg and 104 and 106 on a second leg. The node of the resistors 102 and 104 is coupled to the base of a first switching transistor 108. The node between resistors 104 and 106 is coupled to the base of a second switching transistor 110. The resistors 102 and 106 are coupled to a common node and preferably through three diodes 109, 111, 113 to a common return line 112. The three diodes 109, 111, 113 provide a defined voltage drop and temperature compensation for the transmit circuits 18. The first and second switching transistors 108 and 110 have their emitters coupled in common and to emitter resistor 114 coupled to common line 112. The voltage at the taps of the voltage dividers at resistors 102 and 106 and the value of the emitter resistor 114 define the current load through the switching transistors 108 and 110. The switching transistors 108 and 110 carry the current which is transmitted to the transmit transformers 20 and 22. Signal drive is through the collectors of switching transistors 108 and 110. However, the capacitor 116 coupled between the collectors of transistors 108 and 110 and capacitor 120 coupled between the voltage divider and a collector node of switching transistor 110 limit rise and fall time on the transmitted signal so that the rise and fall time are within the specification limits defined for the communication medium. The node of the collector of transistor 110 is coupled in common to emitters of transistors 122 and 124, the collectors of which are coupled respectively to the input side 52 of first transmit transformer 20 and the input side 54 of second transmit transformer 22. A toggling voltage reference 126 is coupled to the bases of transistors 122 and 124 to alternately enable transistors 122 or 124 to pass current through the transmit transformers 20 and 22. The transmit circuits 18 may be disabled by a turn off signal applied at the base of transistor 110 from the time out circuit 26. When transistor 110 is held off, current will flow only in collision reference line 88.

Referring to FIG. 3, there is shown one embodiment of the receive input circuit 36 coupled to the receive isolation transformer 38. According to the invention, the coaxial coupling 14 is coupled through an attenuating resistor 127 and a compensation capacitor 128 to the input side 130 of receiver isolation transformer 38. The output side 132 of receiver transformer 38 has coupled across it a resistor 134 and capacitor 136 which represent the input impedance to the input of an amplifier 138 including parasitic capacitance. The values of resistor 134 and capacitor 136 are selected in combination with the values for resistor 127 and capacitor 128 in a distributed resistive and capacitive divider network to increase the input impedance of the coaxial coupling while using an amplifier 138 with relatively low input impedance. Further, according to the invention, a nulling capacitor 140 is cross-coupled between the input side 130 and the output side 132 of receive transformer 38 for nulling out undesired common mode voltages which may appear differentially across the transformer 38.

The transformers 20, 22 and 38 are preferably bifilar wound, ferrite core transformers having a one to one turns ratio so that unity voltage coupling is effected between the input side and output side thereof. While other transformer arrangements could be employed, one to one turns ratio transformers are preferred because it is relatively easy to minimize parasitic capacitance and leakage inductance in transformers constructed having a one to one turns ratio.

The invention has now been explained with reference to specific embodiments. Other embodiments will be apparent to those of ordinary skill in the art. It is therefore not intended for this invention be limited except as indicated by the appended claims.

I claim:

1. A local computer network coaxial cable transceiver having a coaxial cable coupling, said coaxial cable coupling having a first terminal and a second terminal coupling to a communication medium, said transceiver comprising:
   a first diode;
   a first transmitter isolation transformer, said first transformer having an input winding and an output winding, said first diode and said first transformer defining together a first output set, said first diode being coupled in series between said first terminal and said output winding for allowing current in said output winding to flow in only one direction in said communication medium while also permitting an AC signal to be conveyed through said communication medium;
   a second diode, said second diode being coupled in series with said first diode and at a close proximity to said first terminal for minimizing parasitic capacitance at said coaxial cable coupling, said first terminal being for connection to a shielded center conductor;
   a resistor in series between said first diode and said second diode, said resistor for limiting current under fault conditions at said coaxial cable coupling, and wherein said input winding is coupled to a transmit drive means for applying an AC signal to said input winding.

2. The transceiver according to claim 1 further including a capacitor coupled between said second terminal and the common node of said first diode and of said resistor for attenuating undesired high frequency energy in transmitted signals across said output side.

3. A local network coaxial cable transceiver having a coaxial cable coupling, said coaxial cable coupling having a first terminal and a second terminal coupling to a communication medium, said transceiver comprising:
   a first diode;
   a first transmitter isolation transformer, said first transformer having an input winding and an output winding, said first diode and said first transformer defining together a first output set, said first diode being coupled in series between said first terminal and said output winding for allowing current in said output winding to flow in only one direction in said communication medium while also permitting an AC signal to be conveyed through said communication medium; at least a second transmitter isolation transformer and a third diode in combination to define a second output set, said second output set being coupled in parallel with said first output set; and
   means for driving said first and second output sets alternately into an active state to allow sufficient flyback recovery time for each said transmitter transformer wherein said input winding is coupled to said dividing means for applying an AC signal to said input side.

4. The transceiver according to claim 2 further including at least a second transmitter isolation transformer and a third diode in combination to define a second output set, said second output set being coupled in parallel with said first output set, and means for driving said first and second output sets alternately into an active state to allow sufficient flyback recovery time for each said transmitter transformer.

5. A local computer network coaxial cable transceiver having a coaxial cable coupling, said coaxial cable coupling having a first terminal and a second terminal coupling to a communication medium, said transceiver comprising:
   a first diode;
   a first transmitter isolation transformer, said first transformer having an input winding and an output winding, said first diode and said first transformer defining together a first output set, said first diode being coupled in series between said first terminal and said output winding for allowing current in said output winding to flow in only one direction in said communication medium while also permitting an AC signal to be conveyed through said communication medium,
   wherein said input side is coupled to a transmit drive means for applying an AC signal to said input side; and
   a collision sensing circuit coupled to said input winding, said collision sensing circuit including a fourth diode coupled to a first terminal of said input winding for enabling detection of other signals during transmission by said transmit drive means and for isolating flyback voltage across said transformer when said first diode and said fourth diode are reverse biased.

6. The transceiver according to claim 5 wherein said collision sensing circuit further includes a charging capacitor coupled between said fourth diode and a second input winding terminal for sampling a peak transmitted voltage level across said coaxial cable coupling.

7. The transceiver according to claim 6 wherein said collision sensing circuit further includes a comparator and a drive circuit, said comparator having as a first comparator input a voltage level established by said charging capacitor and as a second comparator input a voltage level established by a reference level network, said reference level network comprising a reference capacitor coupled between said second comparator input and a reference means, said reference means being common to said charging capacitor and said reference capacitor, and said drive circuit being coupled to maintain charge on said reference capacitor during operation of said transceiver such that the voltage level across said reference capacitor tracks transmit current.

8. A local computer network coaxial cable transceiver having a coaxial cable coupling, said coaxial cable coupling having a first terminal and a second terminal coupling to a communication medium, said transceiver comprising:
a first diode;
a first transmitter isolation transformer, said first transformer having an input winding and an output winding, said first diode and said first transformer defining together a first output set, said first diode being coupled in series between said first terminal and said output winding for allowing current in said output winding to flow in only one direction in said communication medium while also permitting an AC signal to be conveyed through said communication medium,
wherein said input winding is coupled to a transmit drive means for applying an AC signal to said input side;
a receive isolation transformer having an input side and an output side;
a nulling capacitor; and
a high input impedance means coupled to said input side,
said receive transformer having said receive input side coupled through said high impedance means with said coaxial cable coupling, said receive transformer having said receive output side coupled to an amplifier circuit, said nulling capacitor being cross-coupled between said receive input side and said receive output side, said nulling capacitor for nulling undesired common mode voltages which may appear across said receive output side.

9. The transceiver according to claim 8 further including a resistive and capacitive divider network, said divider network being distributed between said receive input side and said receive output side for increasing input impedance of said coaxial cable coupling.

10. A local computer network coaxial cable transceiver having a coaxial cable coupling, said coaxial cable coupling having a first terminal and a second terminal coupling to a communication medium, said transceiver comprising:
a first diode;
a first transmitter isolation transformer, said first transformer having an input winding and an output winding, wherein said transmit transformer is a unity voltage bifilar wound transformer, said first diode and said first transformer defining together a first output set, said first diode being coupled in series between said first terminal and said output winding for allowing current in said output winding to flow in only one direction in said communication medium while also permitting an AC signal to be conveyed through said communication medium; and
wherein said input winding is coupled to a transmit drive means for applying an AC signal to said input winding.

11. The transceiver according to claim 7 wherein each said transmit transformer is a unity voltage bifilar wound transformer.

12. The transceiver according to claim 8 wherein each said transmit transformer and said receive transformer are unity voltage bifilar wound transformers.

13. A local computer network coaxial transceiver having a coaxial cable coupling, said coupling having a first terminal and a second terminal for coupling to a communication medium, said transceiver comprising:
a receive isolation transformer;
a nulling capacitor;
a high impedance means;
said receive transformer having a receive input side coupled through said high impedance to said coaxial cable coupling; said receive transformer having a receive output winding coupled to an amplifier circuit, said nulling capacitor being cross-coupled between said receive input winding and said receive output winding for nulling out undesired common mode voltages which may appear across said receive output winding.

14. The transceiver according to claim 13 further including a resistive and capacitive divider network, said divider network being distributed between said receive input side and said receive output side for increasing input impedance of said coaxial coupling.

* * * * *

UNITED STATES PATENT AND TRADEMARK OFFICE
CERTIFICATE OF CORRECTION

PATENT NO. : 4,649,548

DATED : March 10, 1987

INVENTOR(S) : Ronald C. Crane

It is certified that error appears in the above-identified patent and that said Letters Patent is hereby corrected as shown below:

Title page, at "[73]", please insert --3Com Corporation, Santa Clara, California--.

Signed and Sealed this

Twenty-sixth Day of November, 1991

Attest:

HARRY F. MANBECK, JR.

*Attesting Officer*  *Commissioner of Patents and Trademarks*